United States Patent
Altshuler et al.

(10) Patent No.: US 7,787,462 B2
(45) Date of Patent: Aug. 31, 2010

(54) APPLYING FEATURES TO PACKETS IN THE ORDER SPECIFIED BY A SELECTED FEATURE ORDER TEMPLATE

(75) Inventors: Sarel Altshuler, Haifa (IL); Nisim Levi, Tel-Aviv (IL); Nir Ben-Dvora, Herzliya (IL); Doron Oz, Even Yehuda (IL)

(73) Assignee: Cisco Technology, Inc., San Jose, CA (US)

( * ) Notice: Subject to any disclaimer, the term of this patent is extended or adjusted under 35 U.S.C. 154(b) by 827 days.

(21) Appl. No.: 11/368,923

(22) Filed: Mar. 6, 2006

(65) Prior Publication Data

US 2007/0206490 A1  Sep. 6, 2007

(51) Int. Cl.
*H04L 12/28* (2006.01)
*H04L 12/56* (2006.01)
(52) U.S. Cl. .................... 370/392; 370/389; 370/252
(58) Field of Classification Search ................. 370/392, 370/389, 232, 218, 252, 469, 253, 254, 401, 370/411, 465, 466, 365, 514; 709/230, 250; 375/368
See application file for complete search history.

(56) References Cited

U.S. PATENT DOCUMENTS

| | | | |
|---|---|---|---|
| 6,741,594 B1 * | 5/2004 | Tzeng et al. | 370/392 |
| 6,744,783 B1 * | 6/2004 | Tzeng | 370/469 |
| 7,002,955 B1 * | 2/2006 | Kanuri et al. | 370/389 |
| 7,304,999 B2 | 12/2007 | Sukonik et al. | |
| 7,404,015 B2 | 7/2008 | Zemach et al. | |
| 7,522,595 B2 * | 4/2009 | Ben-Dvora et al. | 370/389 |
| 2002/0032797 A1 * | 3/2002 | Xu | 709/238 |
| 2002/0131401 A1 * | 9/2002 | Ehreth | 370/352 |
| 2003/0212818 A1 * | 11/2003 | Klein et al. | 709/238 |
| 2004/0216122 A1 * | 10/2004 | Gram et al. | 719/310 |

* cited by examiner

*Primary Examiner*—Ayaz R Sheikh
*Assistant Examiner*—Chuong T Ho
(74) *Attorney, Agent, or Firm*—The Law Office of Kirk D. Williams (57) ABSTRACT

Disclosed are, inter alia, methods, apparatus, data structures, computer-readable media, mechanisms, and means for applying features to packets in an order specified by a selected feature order template. By providing multiple feature order templates, a network device manufacturer can provide the user of the network device the ability to select among a variety of orders in which features are applied, while limiting the possible selectable orderings such as to those capable by the hardware and software of the network device, and/or to a subset of orderings thereof which has been thoroughly tested. Some devices further allow a user to define new feature order templates via a user interface.

37 Claims, 6 Drawing Sheets

APPLYING FEATURES TO PACKETS IN THE ORDER SPECIFIED BY A SELECTED FEATURE ORDER TEMPLATE

TECHNICAL FIELD

One embodiment of the invention relates to communications and computer systems, especially routers, packet switching systems, and other devices; and more particularly, one embodiment relates to applying features to packets in an order specified by a selected feature order template.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

A network device, such as a switch or router, typically receives, processes, and forwards or discards packets. A part of such processing typically includes applying multiple features to each packet, whether at an ingress line card, egress line card, and/or at some other place within the network device. Examples of such features, include, but are not limited to: access control lists (ACLs), quality of service (QoS) (e.g., committed access rate, rate-limiting, shaping, marking, etc.), aggregated/sampled Netflow accounting, unicast reverse-path forwarding (uRPF), policy-based routing, Border Gateway Protocol (BGP) policy accounting, QoS policy propagation via BGP, accounting, statistics, web cache redirect, lawful Interception, IPSec encryption/decryption, intrusion detection and prevention, state-full firewall, network address translation, and network-based application recognition. Typically, not all of these features are enabled, and only the enabled features are applied to the packets.

Network providers and customers desire the ability to control the order in which features are applied. Different orders of applying features to a packet can produce different results. For a simple example, applying a feature that filters packets (e.g., causes some packets to be dropped) prior to a feature that maintains or relies on statistics or packet counts for packets after the filtering of packets will produce different results than if this order was reversed. Also, the order in which these features are applied to a packet in a specific device may be limited by the hardware based on its design (e.g., some resources required for the application are only accessible at certain locations) or the hardware may offer complete flexibility such as in a microcode-based network device. There appears to be a trade-off between the flexibility in the allowed feature application order and the complexity in implementing and testing an arbitrary feature application order. Desired are flexible network devices which allow the ability to define the desired order in which features are applied to packets.

SUMMARY

Disclosed are, inter alia, methods, apparatus, data structures, computer-readable media, mechanisms, and means for applying features to packets in an order specified by a selected feature order template.

One embodiment includes: a packet switching device including a plurality of interfaces for receiving packets into the packet switching device and for transmitting packets from the packet switching device; wherein packet switching device is configured to apply enabled features of a plurality of features to packets; wherein the order in which said enabled features are applied to a particular packet is determined by a currently selected feature order template of a plurality of selectable predetermined feature order templates, each of the plurality of feature order templates specifying a different application order for said features.

In one embodiment, said features include enabled and not enabled features. In one embodiment, said features include all possible features. In one embodiment, a first selected feature order template of the plurality of selectable predetermined feature order templates is applied to a first input interface of said interfaces, and a second selected feature order template of the plurality of selectable predetermined feature order templates is applied to a second input interface of said interfaces; wherein the first and second selected feature order templates specify different application orders for said features. In one embodiment, the first selected feature order template specifies an order of applying said features including one or more features that are not enabled.

In one embodiment, a first selected feature order template of the plurality of selectable predetermined feature order templates is applied to a first input interface of said interfaces, and a second selected feature order template of the plurality of selectable predetermined feature order templates is applied to a first output interface of said interfaces; wherein the first and second selected feature order templates specify different application orders of said features.

One embodiment includes a packet classifier for identifying the currently selected feature order template from the plurality of selectable predetermined feature order templates based on one or more fields or data extracted from the particular packet, an interface associated with the particular packet, and/or a direction (e.g., ingress or egress) associated with the particular packet.

In one embodiment, which of the plurality of selectable predetermined feature order templates is the currently selected feature order template is automatically determined based on a state of packet traffic. In one embodiment, the currently selected feature order template is a first feature order template of the plurality of selectable predetermined feature order templates when said state of packet traffic reflects that a denial of service attack has not been identified and is a second feature order template of the plurality of selectable predetermined feature order templates when said state of packet traffic reflects that a denial of service attack has been identified; wherein the first and second feature order templates specify different application orders for said features. In one embodiment, which of the plurality of selectable predetermined feature order templates is the currently selected feature order template is automatically determined based on a state of the apparatus.

In one embodiment, the plurality of different features including access control list and quality of service. In one embodiment, the plurality of different features includes network address translation. One embodiment includes means for specifying a new feature order template and adding the new feature order template to the plurality of selectable predetermined feature order templates. One embodiment includes at least two different cards on each of which at least one of said features are applied to the particular packet according to the order specified by the currently selected feature order template, with each of said different cards including a data structure for identifying at least a portion of said order specified by the currently selected feature order template.

One embodiment includes at least two different cards on each of which at least one of said features are applied to the particular packet according to the order specified by the currently selected feature order template, with at least a portion of said order specified by the currently selected feature order template is included in metadata associated with the particular packet, said metadata being used by at least one of said at least two different cards to identify the order specified by the currently selected feature order template.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 3 is a block diagram illustrating exemplary metadata associated with a packet to identify the currently selected feature order template or a feature order extracted there from.

DETAILED DESCRIPTION

Disclosed are, inter alia, methods, apparatus, data structures, computer-readable media, mechanisms, and means for applying features to packets in an order specified by a selected feature order template.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value —the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage mechanisms. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

By providing multiple feature order templates, a network device manufacturer can provide the user of the network device the ability to select among a variety of orders in which features are applied, while limiting the possible selectable orderings such as to those capable by the hardware and software of the network device, and/or to a subset of orderings thereof which has been thoroughly tested. Some devices further allow a user to define new feature order templates via a user interface.

One embodiment includes: a packet switching device including a plurality of interfaces for receiving packets into the packet switching device and for transmitting packets from the packet switching device; wherein packet switching device is configured to apply enabled features of a plurality of features to packets; wherein the order in which said enabled features are applied to a particular packet is determined by a currently selected feature order template of a plurality of selectable predetermined feature order templates, each of the plurality of feature order templates specifying a different application order for said features.

In one embodiment, said features include enabled and not enabled features. In one embodiment, said features include all possible features. In one embodiment, a first selected feature order template of the plurality of selectable predetermined feature order templates is applied to a first input interface of said interfaces, and a second selected feature order template of the plurality of selectable predetermined feature order templates is applied to a second input interface of said interfaces; wherein the first and second selected feature order templates specify different application orders for said features. In one embodiment, the first selected feature order template specifies an order of applying said features including one or more features that are not enabled.

In one embodiment, a first selected feature order template of the plurality of selectable predetermined feature order templates is applied to a first input interface of said interfaces, and a second selected feature order template of the plurality of selectable predetermined feature order templates is applied to a first output interface of said interfaces; wherein the first and second selected feature order templates specify different application orders of said features.

One embodiment includes a packet classifier for identifying the currently selected feature order template from the plurality of selectable predetermined feature order templates based on one or more fields or data extracted from the particular packet, an interface associated with the particular packet, and/or a direction (e.g., ingress or egress) associated with the particular packet.

In one embodiment, which of the plurality of selectable predetermined feature order templates is the currently selected feature order template is automatically determined based on a state of packet traffic. In one embodiment, the currently selected feature order template is a first feature order template of the plurality of selectable predetermined feature order templates when said state of packet traffic reflects that a denial of service attack has not been identified and is a second feature order template of the plurality of selectable predetermined feature order templates when said state of packet traffic reflects that a denial of service attack has been identified; wherein the first and second feature order templates specify different application orders for said features.

In one embodiment, the plurality of different features including access control list and quality of service. In one embodiment, the plurality of different features includes network address translation. One embodiment includes means for specifying a new feature order template and adding the new feature order template to the plurality of selectable predetermined feature order templates. One embodiment includes at least two different cards on each of which at least one of said features are applied to the particular packet according to the order specified by the currently selected feature order template, with each of said different cards including a data structure for identifying at least a portion of said order specified by the currently selected feature order template.

One embodiment includes at least two different cards on each of which at least one of said features are applied to the particular packet according to the order specified by the currently selected feature order template, with at least a portion of said order specified by the currently selected feature order template is included in metadata associated with the particular packet, said metadata being used by at least one of said at least two different cards to identify the order specified by the currently selected feature order template.

In one embodiment, a packet switching device is configured to apply features to packets in a predetermined order. A feature order template of a plurality of selectable predetermined feature order templates is selected, with each of the plurality of feature order templates specifying a different application order for apply features to packets. After said selecting said feature order template, applying enabled features specified in said selected feature order template in the application order specified in said selected feature order template to each of a plurality of packets.

One embodiment further comprises: after said applying enabled features operation; identifying a different feature order template of the plurality of selectable predetermined feature order templates to be the currently selected feature order template; and after said identifying the different feature order template, applying enabled features specified in the currently selected feature order template in the application order specified in the currently selected feature order template to each of a second plurality of packets. In one embodiment, said identifying a different feature order template is performed in response to an identified state of packet traffic. In one embodiment, the identified state of packet traffic includes an identified denial of service attack.

In one embodiment, a packet switching device is configured to apply features to packets in a predetermined order. A first packet is classified resulting in the identification of a first currently selected feature order template of a plurality of selectable predetermined feature order templates, each of the plurality of feature order templates specifying a different application order for apply features to packets. The enabled features are applied in the order identified in the first currently selected feature order template to the first packet in response to said classifying the first packet resulting in the identification of the first currently selected feature order template. A second packet is classified resulting in the identification of a second currently selected feature order template of the plurality of selectable predetermined feature order templates. The enabled features are applied in the order identified in the second currently selected feature order template to the second packet in response to said classifying the second packet resulting in the identification of the second currently selected feature order template. In one embodiment, the same features are applied to the first and second packets, but in a different order.

One embodiment includes an apparatus for receiving, processing and forwarding packets, with the apparatus comprising: a packet switching device including a plurality of interfaces for receiving packets into the packet switching device and for transmitting packets from the packet switching device; said packet switching device including: means for selecting a feature order template of a plurality of selectable predetermined feature order templates, each of the plurality of feature order templates specifying a different application order for apply features to packets; and means for applying enabled features specified in said selected feature order template in the application order specified in the currently selected feature order template to each of a plurality of packets.

Figure 1A:
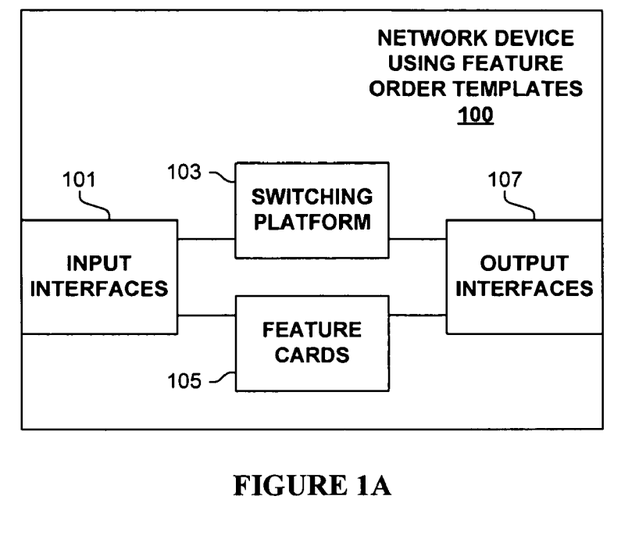
FIGS. 1A-D are block diagrams illustrating a network device and/or components thereof using feature order templates used in one or more embodiments.

Turning to the figures, FIGS. 1A-D are a block diagrams illustrating a network device and/or components thereof using feature order templates used in one or more embodiments. Shown in FIG. 1A is an illustration of a enhanced network device 100, which uses feature order templates to identify the order in which features are applied to packets. These features are typically applied in (real or virtual) input interfaces 101, feature cards 105, and/or (real or virtual) output interfaces 107. Also shown is a switching platform 103 which communicates packets between input and output interfaces.

The act of applying features to packets and switching packets between input and output interfaces is well-known in the art, and therefore will not be discussed herein. For example, U.S. patent application Ser. Nos. 10/227,119 and 10/227,114 are two applications which disclose such network devices, with each of these patent applications being incorporated by reference in its entirety. Rather than discussing already known mechanisms and methods of applying features to packets, the subject of this disclosure focuses on the new ability of defining the order of which these features are applied to packets using feature order templates. By providing multiple feature order templates, a network device manufacturer can provide the user of the network device the ability to select among a variety of orders in which features are applied, while limiting the possible selectable orderings such as to those capable by the hardware and software of the network device, and/or to a subset of orderings thereof which has been thoroughly tested. Some devices further allow a user to define new feature order templates via a user interface. Which constrains the feature orders to those supported by the hardware and software of the network devices.

Figure 1B:
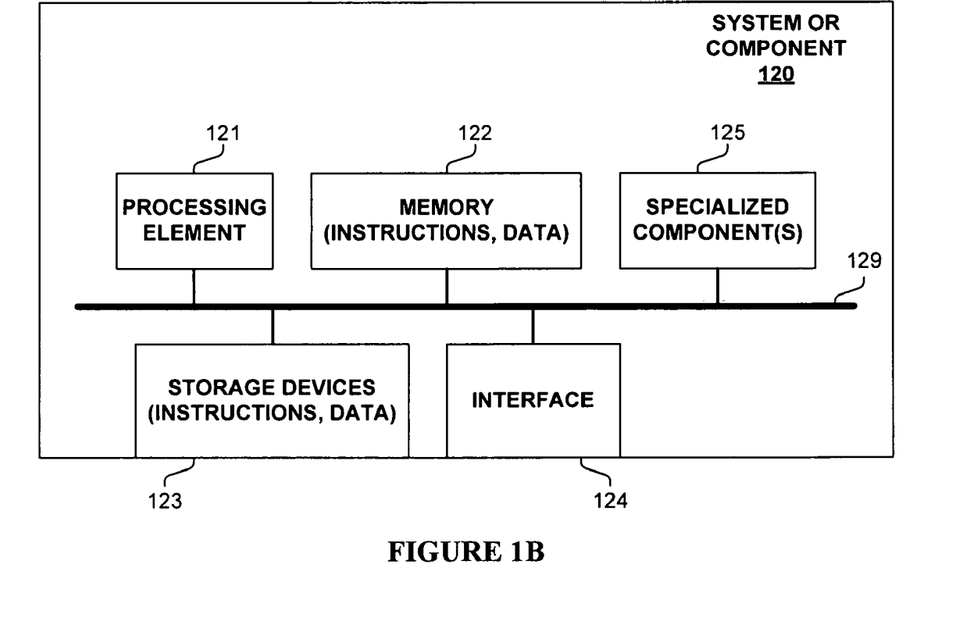

FIG. 1B is block diagram of a system or component 120 used in one embodiment for applying features to packets in an order specified by a selected feature order template. In one embodiment, system or component 120 performs one or more processes corresponding to one of the flow diagrams illustrated or otherwise described herein.

In one embodiment, system or component 120 includes a processing element 121, memory 122, storage devices 123, an interface 124 for sending and receiving packets and/or communicating with external devices or components (e.g. classification or event detection mechanisms), and specialized components 125 (e.g. classification or event detection mechanisms), which are typically communicatively coupled via one or more communications mechanisms 129, with the communications paths typically tailored to meet the needs of the application.

Various embodiments of component 120 may include more or less elements. The operation of component 120 is typically controlled by processing element 121 using memory 122 and storage devices 123 to perform one or more tasks or processes. Memory 122 is one type of computer-readable medium, and typically comprises random access memory (RAM), read only memory (ROM), flash memory, integrated circuits, and/or other memory components. Memory 122 typically stores computer-executable instructions to be executed by processing element 121 and/or data which is manipulated by processing element 121 for implementing functionality in accordance with an embodiment. Storage devices 123 are another type of computer-readable medium, and typically comprise solid state storage media, disk drives, diskettes, networked services, tape drives, and other storage devices. Storage devices 123 typically store computer-executable instructions to be executed by processing element 121 and/or data which is manipulated by processing element 121 for implementing functionality in accordance with an embodiment.

Figure 1C:
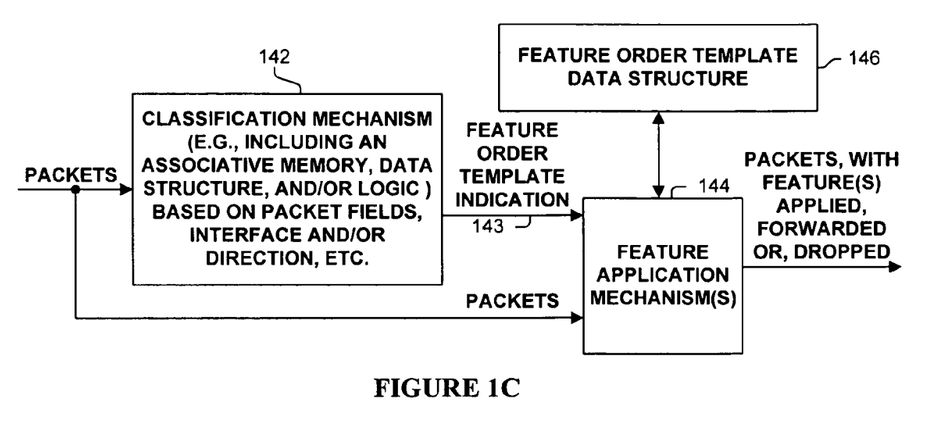

FIG. 1C illustrates a system which identifies which feature order template to use in applying the enabled applications to the packet based on one or more fields or data extracted from the packet, on which interface the packet is currently associated, and/or the current packet direction (e.g., ingress, egress). For example, in one embodiment, a different feature order template will be selected and used on an ingress interface than on an egress interface. In one embodiment, the feature order template applied to a packet is selected based on the current interface and direction associated with the packet. In one embodiment, the feature order template applied to a packet is selected based on the particular interface currently associated with the packet. In one embodiment, the feature order template applied to a particular packet is determined based on one or more fields or data extracted from the particular packet (e.g., based on a source address, destination address, packet type, quality of service, etc.). In one embodiment, multiple feature order templates are used in applying features to a packet. For example, a packet is first processed by an ingress interface based on a first feature order template, then routing is performed on the packet, which is followed by the packet being processed by an egress interface based on a second feature order template. In one embodiment, whenever a packet changes an interface internally, a new feature order template is selected based on the current interface and possibly other information.

Classification mechanisms are well-known in the art, and typically employ an associative memory, a data structure, logic and/or other lookup mechanism. As shown, a packet is received by classification mechanism 142, which classifies the packet typically based on one or more fields or data extracted from the packet, on which interface the packet is currently associated, and/or the packet direction (e.g., ingress, egress) to identify a value 143 corresponding to the selected feature order template, which this order being retrieved from feature order template data structure 146. The enabled features are then applied in the order identified by the selected feature order template by one or more feature application mechanisms 144. The packet is typically then either forwarded or dropped.

Figure 1D:
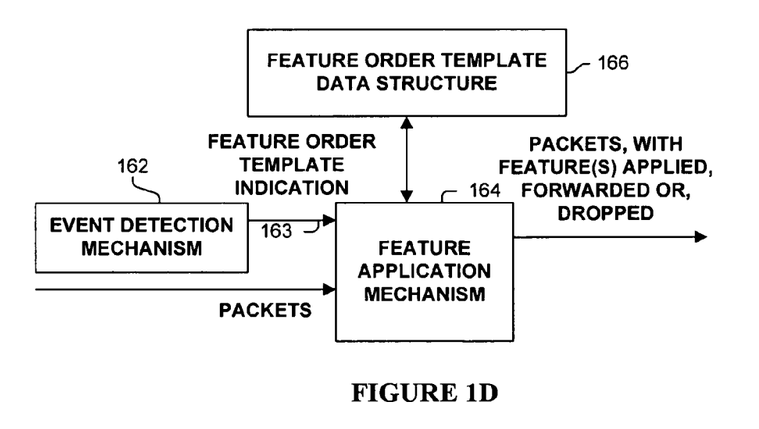

FIG. 1D illustrates a system which reacts to a detected event (e.g., a denial of service or other attack) by changing the currently selected feature order template. As shown, enabled features are applied in the order identified by the selected feature order template (stored in a feature order template data structure 166) by one or more feature application mechanisms 164. In response to an event occurring or no longer being relevant (e.g., a traffic-based state, a state of the network device, etc.), event detection mechanism 162 changes the currently selected feature order template (e.g., generates a new feature order template indication 163 which is used to identify the currently selected feature order template from the feature order template data structure 166).

Figure 2A:
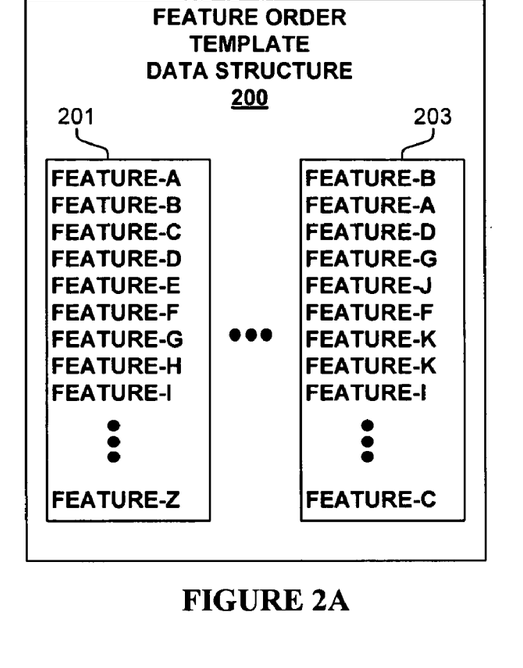
FIGS. 2A-C are block diagrams illustrating feature order templates used in one or more embodiments.

FIG. 2A illustrates an exemplary feature order template data structure 200. Shown are two feature order templates 201 and 203, which list (e.g., in an array or other data structure) the order in which features, if enabled, will be applied to a packet. In one embodiment, only enabled features are included in a feature order template. In one embodiment, both enabled and not enabled features are included in a feature order template.

Figure 2B:
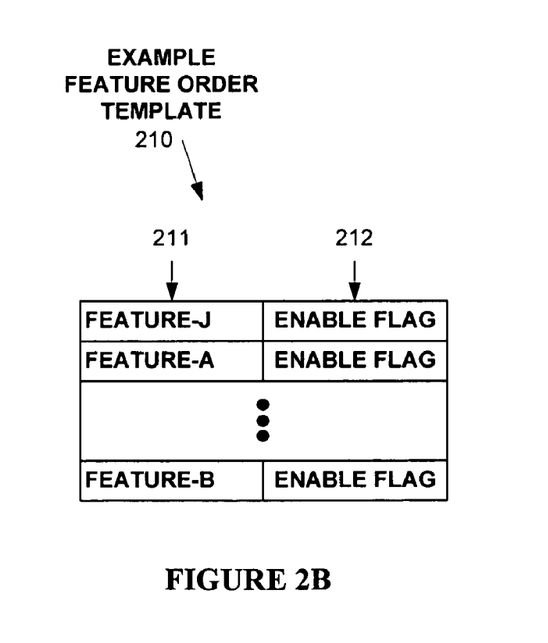

FIG. 2B illustrates an exemplary feature order template 210, which lists the features (211) in the order in which they should be applied, and for each feature, a flag (212) indicating whether or not the corresponding feature is enabled.

Figure 2C:
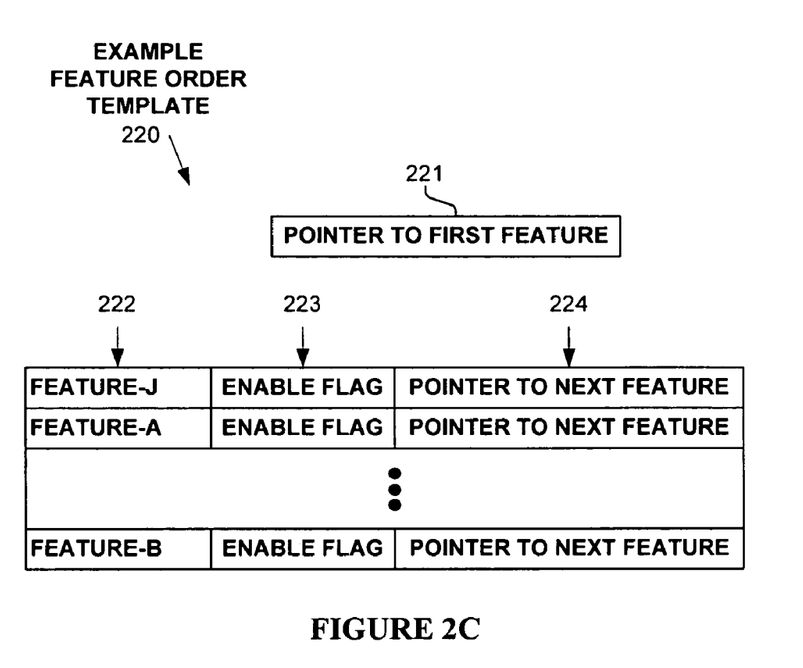

FIG. 2C illustrates another exemplary feature order template 220, which uses a linked list data structure (e.g., first feature pointer 221 and next feature pointers 224) to identifying the order of features (222) as well as whether or not a listed feature is enabled (223).

Figure 3:
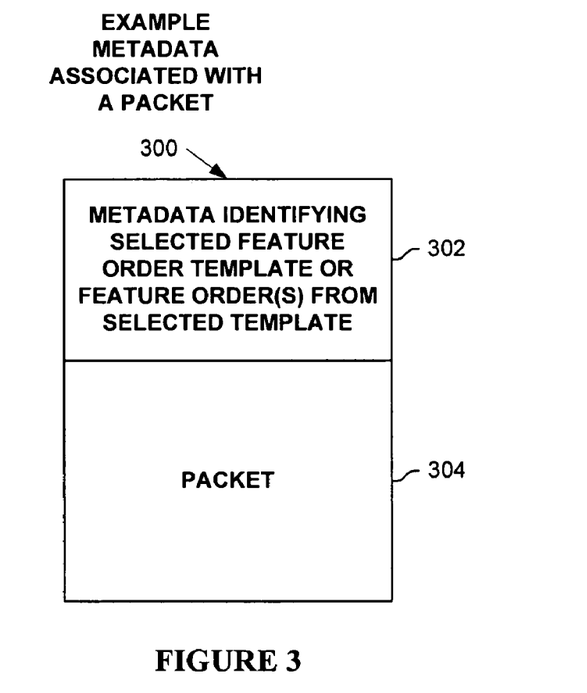

FIG. 3 is a block diagram illustrating a packet with its associated metadata (300). It is common to associate metadata with packets within a network device to help in the processing of a packet. In one embodiment, the metadata (302) associated with a packet (304) includes an indication of the selected feature order template to use in processing the packet, or the order in which to apply features (or a subset thereof, e.g., the order to apply the remaining features) as defined in the corresponding selected feature order template. This provides an easy manner to globally communicate the order to apply features, such as when features are applied in different locations within a network device (e.g., on input interfaces, feature cards, output interfaces, etc.). In one embodiment, the feature order template information is replicated at each of these locations in the network device so the order defined by the feature order template does not need to be included in the metadata, or simply an indication of which feature order template is being applied to the packet is included in the metadata of the packet.

Figure 4A:
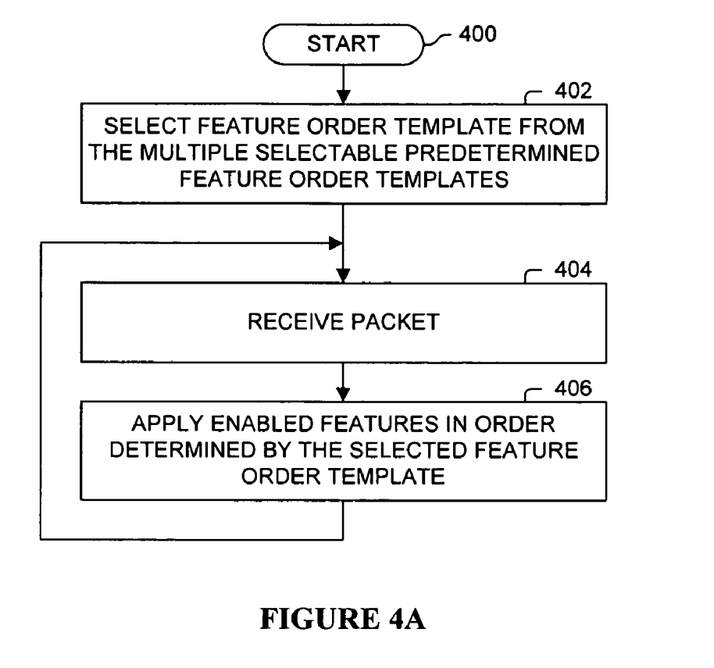
FIGS. 4A-B and 5 are flow diagrams illustrating processes used in one embodiment using feature order templates.

FIG. 4A illustrates a process used in one embodiment for applying features to a packet. Processing begins with process block 400, and proceeds to process block 402, wherein a feature order template to use is selected from the multiple selectable feature order templates. Packets are then received (404) and the enabled features are applied in the order determined by the selected feature template (406). Typically, a selected feature order template is used in applying features to multiple packets. In one embodiment, the selection of a feature order template operation (402) is performed for each packet (e.g., the loop returns to process block 402 instead of 404).

Figure 4B:
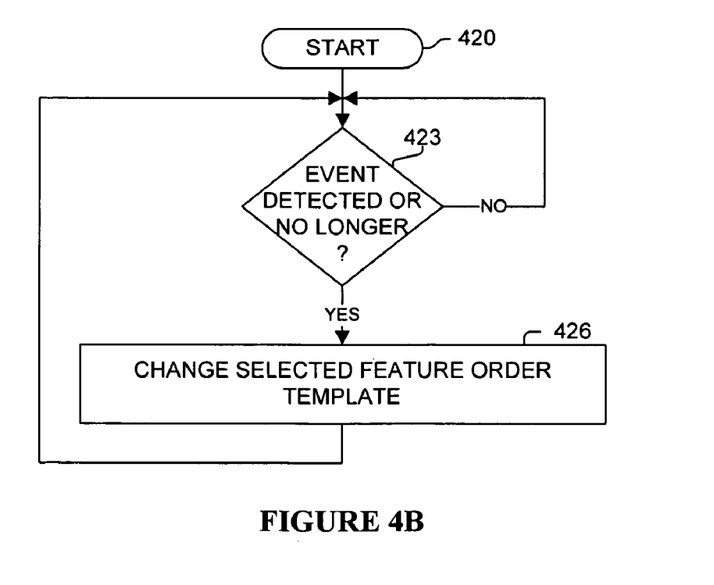

FIG. 4B illustrates a process used in one embodiment to change the selected feature order template in response to the detection of an event, such as a denial of service attack. The detection of these events are well-known in the art, and therefore is not discussed herein. Processing begins with process block 420. As determined in process block 423, when an event (e.g., a traffic-based state, a state of the network device, etc.), is detected as becoming active or no longer active, then in process block 426, the selected feature order template is changed to reflect this condition. For example, one embodiment uses process corresponding to the flow diagrams illustrated in FIG. 4A and 4B to apply features to packets, including changing the selected feature order template defining the order to apply features to packet in response to detected events.

Figure 5:
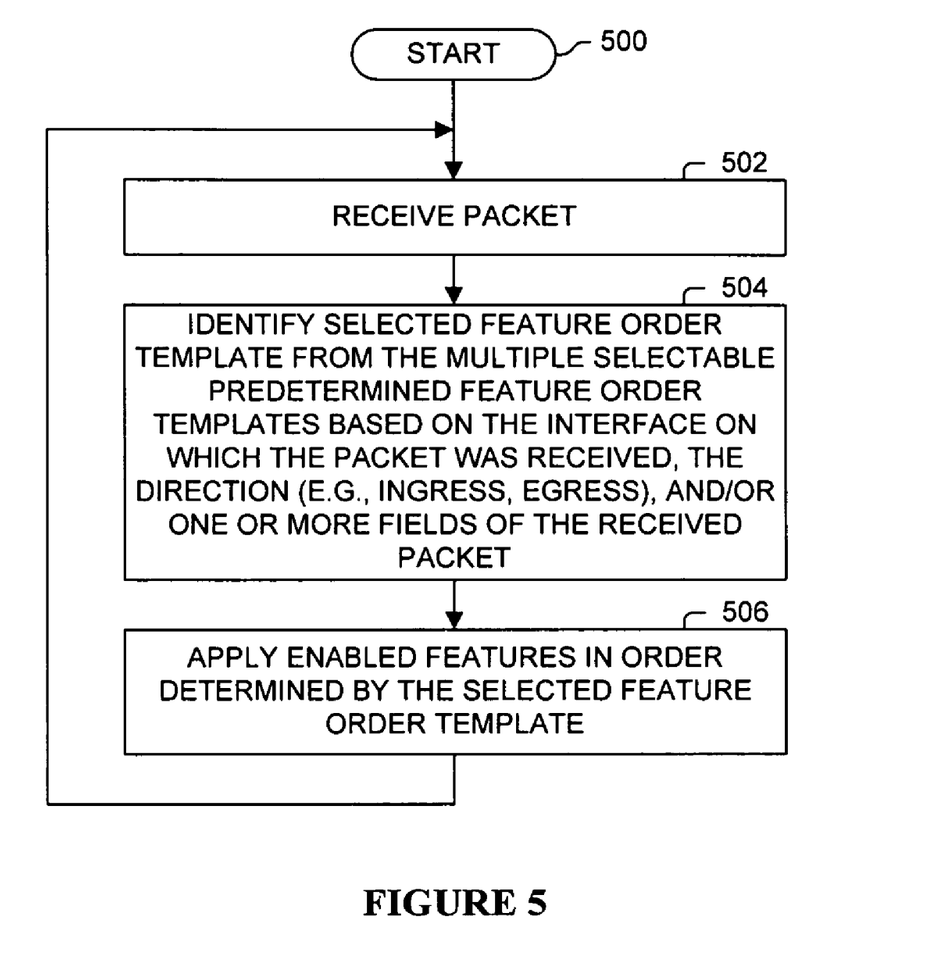

FIG. 5 illustrates a process used in one embodiment wherein the feature order template is selected for each packet based on a classification of each packet (e.g., based on a value of one or more fields of a packet and/or other state information). Processing begins with process block 500, and proceeds to process block 502, wherein a packet is received. In process block 504, the packet is classified, (e.g., based on one or more fields or data extracted from the packet, on which interface the packet was received or from which it will possibly be forwarded and/or the packet direction (e.g., ingress, egress), to identify a selected feature order template of multiple possible feature order templates. In process block 506, the enabled features are applied to the received packet in the order specified by the selected feature order template. Processing returns to process block 502 to receive and process another packet.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for receiving, processing and forwarding packets, the apparatus comprising:
a packet switching device including:
   a plurality of interfaces for receiving packets into the packet switching device and for transmitting packets from the packet switching device;
   a switching platform configured for communicating packets between the plurality of interfaces; and
   one or more feature application mechanisms configured to apply enabled features of a plurality of features to packets, with said application of enabled features being applied to said packets while said packets reside within the packet switching device;
wherein the order in which said enabled features are applied to a particular packet is determined by a currently selected feature order template of a plurality of selectable predetermined feature order templates, each of the plurality of selectable predetermined feature order templates specifying a different application order for said features;
wherein each of the plurality of selectable predetermined feature order templates is provided by a manufacturer of the apparatus; and
wherein the plurality of selectable predetermined feature order templates constrain the packet switching device to only apply said enabled features in an order defined by the plurality of selectable predetermined feature order templates, preventing the packet switching device from applying said enabled features in at least one other order otherwise supported by the packet switching device.

2. The apparatus of claim 1, wherein said features include enabled and not enabled features.

3. The apparatus of claim 2, wherein said features include all possible features that could be said applied to said packets by the apparatus.

4. The apparatus of claim 1, wherein a first selected feature order template of the plurality of selectable predetermined feature order templates is applied to a first input interface of said interfaces, and a second selected feature order template of the plurality of selectable predetermined feature order templates is applied to a second input interface of said interfaces; wherein the first and second selected feature order templates specify different application orders for said features.

5. The apparatus of claim 4, wherein the first selected feature order template specifies an order of applying said features including one or more features that are not enabled.

6. The apparatus of claim 1, wherein a first selected feature order template of the plurality of selectable predetermined feature order templates is applied to a first input interface of said interfaces, and a second selected feature order template of the plurality of selectable predetermined feature order templates is applied to a first output interface of said interfaces; wherein the first and second selected feature order templates specify different application orders of said features.

7. The apparatus of claim 1, including a packet classifier configured to identify the currently selected feature order template from the plurality of selectable predetermined feature order templates based on one or more fields or data extracted from the particular packet.

8. The apparatus of claim 1, including a packet classifier configured to identify the currently selected feature order template from the plurality of selectable predetermined feature order templates based on an interface associated with the particular packet.

9. The apparatus of claim 8, wherein the packet classifier is configured to said identify the currently selected feature order template based on the interface associated with the particular packet and either an ingress or egress direction associated with the particular packet and the interface.

10. The apparatus of claim 1, wherein which of the plurality of selectable predetermined feature order templates is the currently selected feature order template is automatically determined based on a state of packet traffic.

11. The apparatus of claim 10, wherein the currently selected feature order template is a first feature order template of the plurality of selectable predetermined feature order templates when said state of packet traffic reflects that a denial of service attack has not been identified and is a second feature order template of the plurality of selectable predetermined feature order templates when said state of packet traffic reflects that a denial of service attack has been identified;

wherein the first and second feature order templates specify different application orders for said features.

12. The apparatus of claim 1, wherein which of the plurality of selectable predetermined feature order templates is the currently selected feature order template is automatically determined based on a state of the apparatus.

13. The apparatus of claim 1, wherein the plurality of different features include access control list and quality of service.

14. The apparatus of claim 1, wherein the plurality of different features includes network address translation.

15. The apparatus of claim 1, including means for specifying a new feature order template and adding the new feature order template to the plurality of selectable predetermined feature order templates.

16. The apparatus of claim 1, including at least two different cards on each of which at least one of said features are applied to the particular packet according to the order specified by the currently selected feature order template, with each of said different cards including a data structure for identifying at least a portion of said order specified by the currently selected feature order template.

17. The apparatus of claim 1, including at least two different cards on each of which at least one of said features are applied to the particular packet according to the order specified by the currently selected feature order template, with at least a portion of said order specified by the currently selected feature order template is included in metadata associated with the particular packet, said metadata being used by at least one of said at least two different cards to identify the order specified by the currently selected feature order template.

18. An automated method performed by a packet switching device configured to apply features to packets in a predetermined order, the method comprising:
  selecting a feature order template of a plurality of selectable predetermined feature order templates, each of the plurality of selectable predetermined feature order templates specifying a different application order for apply features to packets; and
  after said selecting the feature order template, applying, within and by the packet switching device, enabled features specified in said selected feature order template in the application order specified in said selected feature order template to each of a plurality of packets while residing in the packet switching device;
  wherein the packet switching devices includes: a plurality of interfaces for receiving packets into the packet switching device and for transmitting packets from the packet switching device, and a switching platform configured for selectively communicating packets between the plurality of interfaces;
  wherein each of the plurality of selectable predetermined feature order templates is provided by a manufacturer of the packet switching device; and
wherein the plurality of selectable predetermined feature order templates constrain the packet switching device to only apply said enabled features in an order defined by the plurality of selectable predetermined feature order templates, preventing the packet switching device from applying said enabled features in at least one other order otherwise supported by the packet switching device.

19. The method of claim 18, comprising: after said applying enabled features operation; identifying a different feature order template of the plurality of selectable predetermined feature order templates to be the currently selected feature order template; and after said identifying the different feature order template, applying enabled features specified in the currently selected feature order template in the application order specified in the currently selected feature order template to each of a second plurality of packets.

20. The method of claim 19, wherein said identifying a different feature order template is performed in response to an identified state of packet traffic.

21. The method of claim 20, wherein the identified state of packet traffic includes an identified denial of service attack.

22. The method of claim 19, wherein said identifying a different feature order template is performed in response to an identified state of the packet switching device.

23. An automated method performed by a packet switching device configured to apply features to packets in a predetermined order, the method comprising:
  classifying a first packet resulting in the identification of a first currently selected feature order template of a plurality of selectable predetermined feature order templates, each of the plurality of selectable predetermined feature order templates specifying a different application order for apply features to packets;
  applying, within and by the packet switching device, enabled features in the order identified in the first currently selected feature order template to the first packet, while the first packet resides within the packet switching device, in response to said classifying the first packet resulting in the identification of the first currently selected feature order template;
  classifying a second packet resulting in the identification of a second currently selected feature order template of the plurality of selectable predetermined feature order templates; and
  applying, within and by the packet switching device, enabled features in the order identified in the second currently selected feature order template to the second packet, while the second packet resides within the packet switching device, in response to said classifying the second packet resulting in the identification of the second currently selected feature order template;
  wherein the packet switching devices includes: a plurality of interfaces for receiving packets into the packet switching device and for transmitting packets from the packet switching device, and a switching platform configured for selectively communicating packets between the plurality of interfaces;
  wherein each of the plurality of selectable predetermined feature order templates is provided by a manufacturer of the packet switching device; and
wherein the plurality of selectable predetermined feature order templates constrain the packet switching device to only apply said enabled features in an order defined by the plurality of selectable predetermined feature order templates, preventing the packet switching device from applying said enabled features in at least one other order otherwise supported by the packet switching device.

24. The method of claim 23, wherein the same features are applied to the first and second packets, but in a different order.

25. The method of claim 23, wherein said classifying the first packet is performed based on one or more fields or data extracted from the first packet.

26. The method of claim 23, wherein said classifying the first packet is performed based on an interface associated with the first packet.

27. The method of claim 26, wherein said classifying the first packet is performed based on either an ingress or egress direction associated with the first packet.

28. An apparatus for receiving, processing and forwarding packets, the apparatus comprising:

a packet switching device including:
- a plurality of interfaces for receiving packets into the packet switching device and for transmitting packets from the packet switching device, and
- a switching platform configured for selectively communicating packets between the plurality of interfaces;

wherein said packet switching device includes:
- means for selecting a feature order template of a plurality of selectable predetermined feature order templates, with each of the plurality of selectable predetermined feature order templates specifying a different application order for apply features to packets, with said application of enabled features being applied to said packets while said packets reside within the packet switching device; and
- means for applying, within and by the packet switching device, enabled features specified in said selected feature order template in the application order specified in said selected feature order template to each particular packet of a plurality of packets while said particular packet resides within the packet switching device; wherein each of the plurality of selectable predetermined feature order templates is provided by a manufacturer of the apparatus; and wherein the plurality of selectable predetermined feature order templates constrain the packet switching device to only apply said enabled features in an order defined by the plurality of selectable predetermined feature order templates, preventing the packet switching device from applying said enabled features in at least one other order otherwise supported by the packet switching device.

29. The apparatus of claim 28, wherein each of said different application orders of the plurality of selectable predetermined feature order templates has been tested by the manufacturer.

30. The apparatus of claim 28, wherein said selected feature order template is selected in response to user-input designation of said selected feature order template.

31. The apparatus of claim 15, wherein said means for specifying the new feature order template includes means for constraining the order of the plurality of features to only those orders supported by the apparatus.

32. The apparatus of claim 1, wherein the currently selected feature order template is selected in response to user-input designation of the currently selected feature order template.

33. The method of claim 18, wherein said operation of selecting the feature order template is performed in response to user-input designation of the currently selected feature order template.

34. The method of claim 18, wherein the plurality of selectable predetermined feature order templates specify only orders, which have been tested by the manufacturer, of applying said enable features.

35. The apparatus of claim 1, wherein the plurality of selectable predetermined feature order templates specify only orders, which have been tested by the manufacturer, of applying said enable features.

36. The method of claim 23, wherein the plurality of selectable predetermined feature order templates specify only orders, which have been tested by the manufacturer, of applying said enable features.

37. The apparatus of claim 28, wherein the plurality of selectable predetermined feature order templates specify only orders, which have been tested by the manufacturer, of applying said enable features.

* * * * *

UNITED STATES PATENT AND TRADEMARK OFFICE
CERTIFICATE OF CORRECTION

PATENT NO. : 7,787,462 B2  
APPLICATION NO. : 11/368923  
DATED : August 31, 2010  
INVENTOR(S) : Altshuler et al.

Page 1 of 1

It is certified that error appears in the above-identified patent and that said Letters Patent is hereby corrected as shown below:

Title Page, Abstract (57), lines 1-4, cancel the text beginning "Disclosed are, inter" to and ending with "feature order template."

Col. 6, lines 30-38, cancel the text beginning "By providing multiple" to and ending with "user interface.", and insert the following:
-- Disclosed are, *inter alia*, methods, apparatus, data structures, computer-readable media, mechanisms, and means for applying features to packets in an order specified by a selected feature order template. --

Col. 8, Line 60, cancel the text beginning "By providing multiple" to and ending "the network devices." in column 9, line 3, and insert the following:
-- Also, by providing multiple feature order templates, a network device manufacturer can provide the user of the network device to select among a variety of orders, while limiting the selectable orderings, such as to those capable by the hardware and software of the network device, and possibly to a subset of orders thereof which has been thoroughly tested. One embodiment also allows for the user to define new feature order templates via a user interface, which constrains the feature orders to those supported by the hardware and software of the network devices. --

Signed and Sealed this  
Twenty-sixth Day of April, 2011

David J. Kappos  
*Director of the United States Patent and Trademark Office*